UNITED STATES PATENT OFFICE.

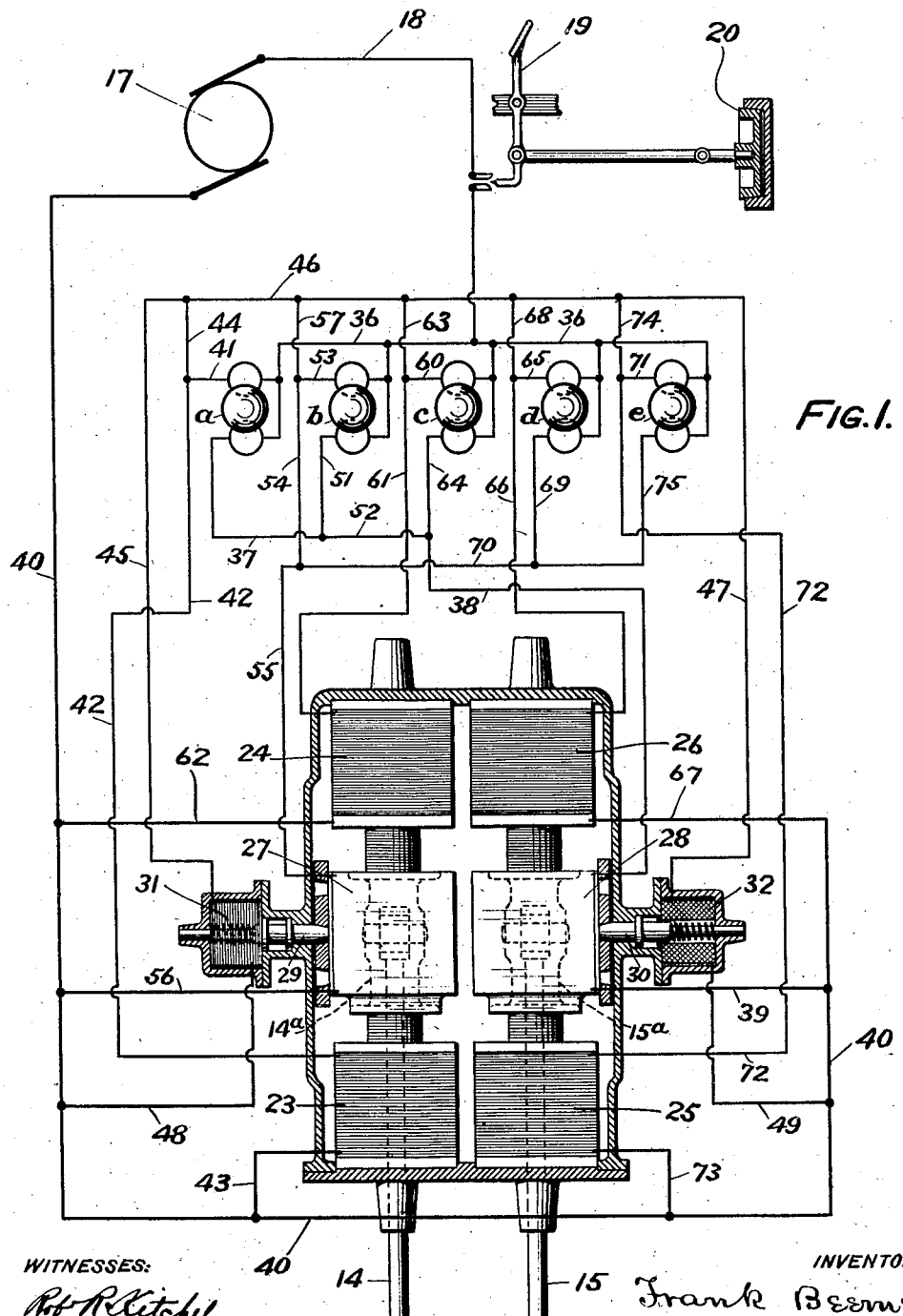

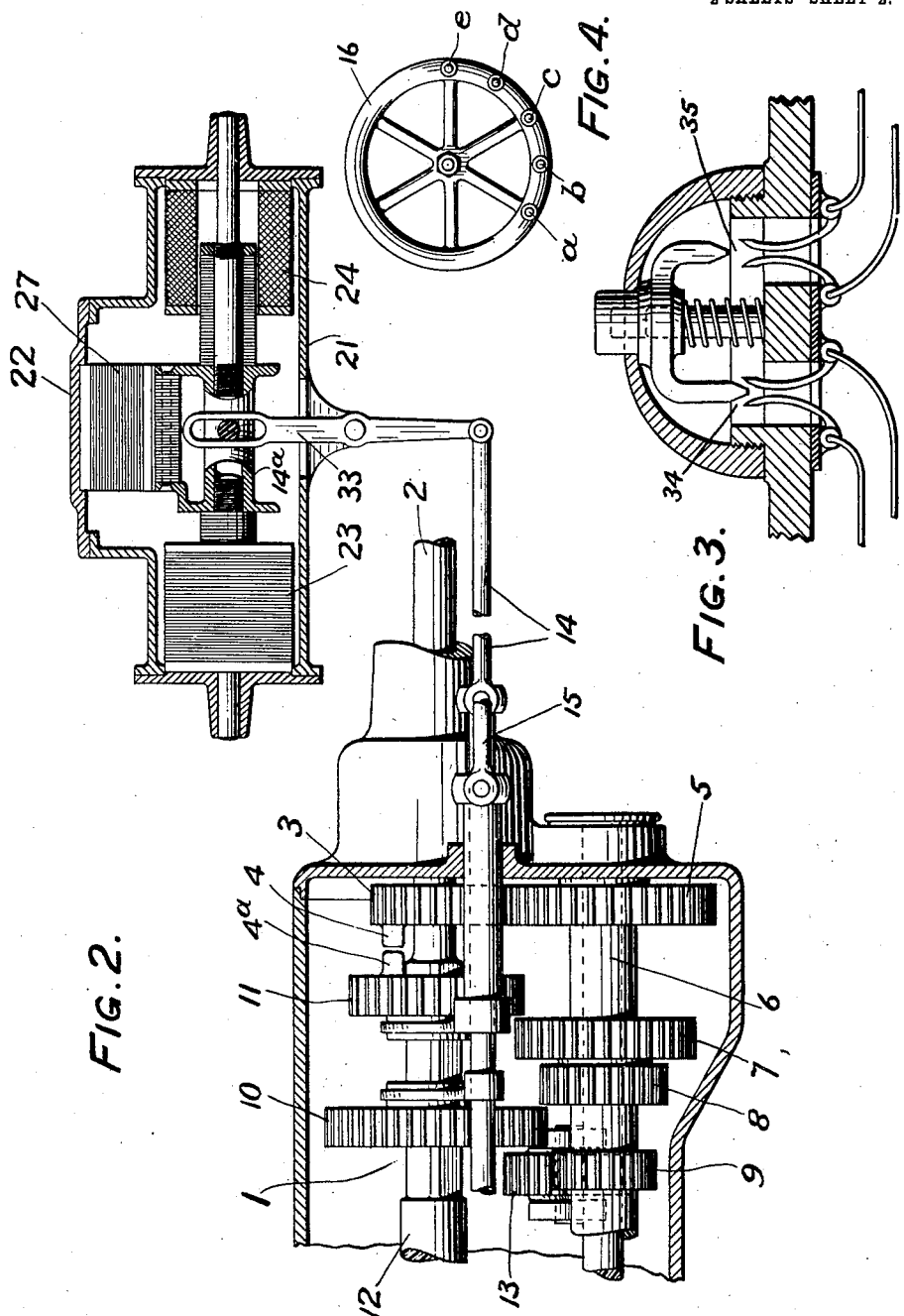

FRANK BEEMER, OF PHILADELPHIA, PENNSYLVANIA, ASSIGNOR TO SAMUEL S. EVELAND, OF PHILADELPHIA, PENNSYLVANIA.

ELECTRIC GEAR-CHANGING MECHANISM FOR AUTOMOBILES.

No. 925,270.      Specification of Letters Patent.      Patented June 15, 1909.

Application filed August 5, 1907. Serial No. 387,014.

*To all whom it may concern:*

Be it known that I, FRANK BEEMER, a citizen of the United States, and resident of Philadelphia, in the county of Philadelphia and State of Pennsylvania, have invented a certain new and useful Electric Gear-Changing Mechanism for Automobiles, of which the following is a specification.

Objects of the present invention are to provide means for quickly changing the gears of the speed mechanism with a rapid, positive motion; to provide means whereby the clutch must be thrown out before any of the gears are shifted; to provide an electric mechanism for controlling the speed gear whereby changes of speed can be made easily and rapidly and without requiring the operator to release the steering gear; to provide electric mechanism for satisfactorily changing the gears and consequently the speed and direction of the automobile or vehicle; and to provide for operating the speed gear to change the speed and direction of motion of an automobile by the simple manipulation of push buttons, or the like, arranged conveniently for operation, by the driver or chauffeur.

Other objects of the invention as well as its nature, characteristic features and scope will be more fully understood from the following description and claims, taken in connection with the accompanying drawings forming part hereof, and in which—

Figure 1, is a diagrammatic view illustrating means embodying features of the invention, showing the electromagnetic device principally in horizontal section. Fig. 2, is an elevational view illustrating the electro-magnetic device and showing its connection with one type of speed gear. Fig. 3, is a sectional view illustrative of one of the push buttons, and Fig. 4, is a view illustrating the push buttons arranged on the steering handle or wheel.

In the drawings 1, is a type of speed gear and it is chosen as a good type in connection with which to describe the invention, but the invention is applicable to other types.

2, is a main or engine shaft upon which is fast the gear 3, provided with a clutch member 4, and meshing with the gear wheel 5, that is fast to a counter-shaft 6. The counter-shaft 6, has fast upon it the gear wheels 7, 8, and 9, and it is continuously driven when the car is in motion.

10 and 11 are gears slidably mounted upon the driving shaft 12, which is connected with the wheels of the vehicle. The gear wheels 10 and 11 while slidable on, rotate with the shaft 12.

13, is an idler that meshes with the gear wheel 9 and is used for reversing the motion of the vehicle.

For reverse motion the gear wheel 10 meshes with the gear wheel 13; for the first speed forward the gear wheel 10 meshes with the gear wheel 8; for the second speed forward the gear wheel 11, meshes with the gear wheel 7 and for the third speed forward a clutch member 4$^a$ on the gear wheel 11 engages the clutch member on the gear wheel 3. For neutral position or rest the gear wheels 10 and 11 are free of engagement with any of the other wheels. The gear wheels 10 and 11 are provided with shippers which are connected with the rods 14 and 15. The rod 14 serves to operate the gear wheel 10 and the rod 15 the gear wheel 11. There is a push button for each change in the speed gear and these push buttons may be conveniently arranged upon the rim of the steering wheel 16, as shown in Fig. 4.

17, indicates a source of current shown as a dynamo which may be properly connected up with the engine and driven by it. A storage battery, however, might be used as a source of current. One of the leads from the storage battery, for example, the lead 18, contains a circuit breaker which is connected with the clutch lever 19, so that the circuit cannot be made until the clutch 20 is thrown out. The advantage of this is that there is no current which can operate the gear shifting mechanism even though the push buttons be pressed, until the clutch is thrown out and it is well known that the clutch should be thrown out before any gear changes are effected.

The electro-mechanical device comprises magnets arranged in a suitable housing. The housing 21, Figs. 1 and 2, is of generally rectangular form and is provided at its top with a raised cover 22. Windings 23, 24, 25, and 26, are arranged in pairs and are connected with the ends of the housing. Of these magnets 23, operates for the first speed; 24, for the reverse; 26 for the second speed and 25, for the third speed. For each pair of magnets there is a core in the form of a reciprocating bar. The bars are marked 14ª and 15ª, respectively and they are afforded bearings through the ends of the housing and are respectively equipped intermediate of their lengths with pole pieces which co-operate with windings 27 and 28 depending from the cover 22 of the housing. The magnets 27 and 28 constitute means for bringing the bars into such position that the gears are in neutral position, *i. e.* in the position shown in Fig. 2.

29 and 30, are spring actuated bolts or dogs which tend to take into one of three suitable openings or recesses in a plate attached to each of the bars, so as to lock the bars and the parts connected therewith when in one of the three positions in which they are moved, as will be hereinafter described.

31 and 32, are electro-magnetic windings for retracting the bolts or dogs to permit movement of the bars. The bars are respectively connected as shown by slot and pin connections with one of the ends of links 33 which at their other ends are connected respectively with the rods 14 and 15. The bars are shown as equipped with laminated cores or armatures, as the laminations are effective when the magnets are energized.

It may be well to state that every time a push button is pushed four magnets are energized, one corresponding to neutral, two corresponding to the dogs and one corresponding with the required speed. Each push button is provided with two contacts 34, and 35, of which one closes its circuit in advance of the other. The circuit which is closed first is the one that brings one of the bars into neutral position and release the dogs to free a bar and the circuit that is closed last, is the one that effects the change in the gear. In this way one of the shifting gears is brought into neutral position when the other is shifted.

*a, b, c, d,* and *e,* are the push buttons and the circuits by which they are made effective for effecting the various changes in the speed gear will now be described.

The push button *a,* corresponds to the first speed, and when it is pushed two circuits are closed, one in advance of the other. The first one closed is from 18 by 36, by 37, by 38, through the neutral magnet 28 by 39 to 40 and thence back to the dynamo. The effect of this is to energize the neutral magnet 28. A second circuit is closed from 36, by 41 to 42, through the first speed magnet 23, and thence by 43 to conductor 40. At the same time a branch is closed from 41 to 44 and then by 45 through the magnet 31 and by 46 and 47 through the magnet 32. From the magnets 31 and 32, the circuits are continued by way of 48 and 49 to the conductor 40. It will therefore be seen that the energized magnets 31 and 32 withdraw the dogs so that the bar 15ª moves to neutral position and the bar 14ª moves toward the left in Fig. 2, under the influence of the magnet 23. Thus the gear 10 is shifted into mesh with the gear 8, which brings about the first forward speed. As soon as the parts have been shifted, which is a very short period of time, and the push button is released the dogs 29 and 30 lock the bars in the new position. It will be understood from what has been stated that the clutch 20 must when provided with a circuit breaker be thrown out before the described circuit can be established.

The push button *b,* corresponds to the neutral position, that is to say the position shown in Fig. 2, where the change gears 10 and 11 are out of mesh. When this push button *b,* is pushed there is a circuit from 36 by way of 50 and thence by way of 51, 52, 38 through magnet 28 by conductor 39 to line 40 and back to the generator. There is also a circuit by way of 53, and then by way of 54, 55, electro-magnet 27 and 56, to line 40. There is also a circuit by way of 57 to 46 to 47 through the electro-magnet 32 and by 49 to line 40. There is also a circuit by 46, 45, magnet 31 by 48 to line 40. It will thus be seen that the magnets 31 and 32 are both energized so that the dogs are retracted and the magnets 27 and 28 are both energized so that the bars 14ª and 15ª are brought into their middle positions with the result that the gears 10 and 11 are out of mesh with all of the other gears.

The push button *c* corresponds to reverse position and when it is pushed the following circuits are closed with the results to be presently described.

There is a circuit from 36 by 60, 61, the winding of the magnet 24, and thence by a conductor 62 to line 40. There is also a circuit by 63, 46, and from 46 not only by 47 and winding 32 and conductor 49 to line 40, but also by conductor 45 through winding 31 and by conductor 48 to line 40. Thus the solenoids 24, 31 and 32 are energized. There is also a circuit by 64, 38, winding 28 and 39, to line 40. In consequence of this closing of circuits the dogs 29 and 30 are retracted, the magnet 28 is energized and brings the bar 15ª into neutral position and the magnet 24 is energized and shifts the bar 14ª in such position that the gear wheel 10 is brought into mesh with the gear wheel 13, which is the reverse drive. As has been described when the push button *c,* is released the dogs 28 and 30 moving under the force of their springs lock the parts in the described position.

The push button *d,* corresponds to the second speed ahead. When it is pushed there is a circuit from 36 by conductor 65, conductor 66, winding 26 and conductor 67 to line 40. Thus the solenoid 26 is energized ready to shift the rod 15 into position for bringing the gear 11 into mesh with the gear 7, which corresponds to the second speed. There is also a circuit from 65 by way of conductor 68, conductor 46 and from thence by not only the conductor 47, winding 32 and conductor 49 to line 40, but also by conductor 45, winding 31 and conductor 48 to line 40, thus the dogs are withdrawn. There is also a circuit by conductor 69, conductor 70, conductor 55, winding 27 and conductor 56 to line 40, so that the magnet 27 is energized and the bar 14ª brought into neutral position.

The push button e, corresponds to the third speed ahead and when it is pushed there is a circuit from 36 by conductor 71, by conductor 72, through winding 25 and by conductor 73 to line 40. There is also a circuit by conductor 74 to conductor 46 and thence not only by conductor 45, through winding 31 and conductor 48 to line 40, but also by conductor 47 through winding 32 and by conductor 49 to line 40. There is also a circuit by conductor 75, conductor 70, conductor 55, through winding 27 and thus by conductor 56 to line 40. In point of time this last described circuit, being the one for neutral position, is closed first so as to be certain that the bar 14ª, is brought into neutral position before the other bar is shifted, all of which has been above mentioned, and occurs whenever any of the push buttons is pushed.

In the described embodiment of the invention the power employed for moving the shifters is electrical in its nature, but it is well known that other power may be employed for doing this work and that it may be controlled electrically. The clutch lever may not be provided with a circuit breaker, in which case the conductor 18 is continuous.

What I claim is:

1. Speed gear change mechanism for automobiles comprising speed-gear shifters, means for positioning the shifters in neutral position electro-magnetic devices for operating the shifters, and circuits including a source of current, and manual switch devices for controlling the electro-magnetic devices, substantially as described.

2. Speed gear change mechanism for automobiles comprising speed gear shifters, electro-magnetic devices for operating the shifters and positioning them in neutral position, and a source of current and manual switch devices and circuits for placing one shifter in neutral position when the other is operated to change speed, substantially as described.

3. Speed gear change mechanism for automobiles comprising speed gear shifters, electro-magnetic dogs for locking the shifters, electro-magnetic devices for operating the shifters, and circuits including a source of current and manual switch devices for controlling the electro-magnetic devices and dogs, substantially as described.

4. Speed gear changing mechanism comprising speed gear shifters, power devices for operating the shifters, means for positioning the shifters in neutral position, and circuits including a source of current and manual switch mechanism for controlling the power devices, substantially as described.

5. Speed gear changing mechanism comprising speed gear shifters, power devices for operating the shifters, dogs for locking the shifters, means for actuating the dogs, and circuits including a source of current and manual switch mechanism for controlling the power devices, and dog actuating means, substantially as described.

6. Speed gear changing mechanism for automobiles comprising speed gear shifters, power devices for operating the shifters, clutch mechanism, and circuits closed through the opening of the clutch mechanism and including a source of current and manual switch mechanism for controlling the power devices, substantially as described.

7. Speed gear changing mechanism for automobiles comprising a steering wheel or handle, speed gear shifters, electro-mechanical devices for operating the shifters, and circuits including a source of current and manual switches arranged on the steering wheel or handle for controlling the electro-mechanical devices, substantially as described.

8. Speed gear changing mechanism for automobiles comprising speed gear shifters, electro-magnetic devices for controlling the shifters to position them in neutral position and in position for changing speed, circuits including a source of current and operatively connected with the respective electro-magnetic devices, and push buttons having two sets of contacts for closing the circuit appertaining to the neutral position of one shifter before closing the circuit appertaining to a speed change position of the other shifter, substantially as described.

9. Speed gear changing mechanism for automobiles comprising a housing having at its ends electro-magnetic windings arranged in pairs in alinement and having intermediate of its ends electro-magnet windings, shifter bars guided through the ends of the housing and constituting cores of the end windings and pole pieces for the intermediate windings, whereby each bar may occupy three positions, and means for selectively energizing said windings, substantially as described.

10. Speed gear changing mechanism for automobiles comprising a housing having at its ends electro-magnetic windings arranged in pairs in alinement and having intermediate of its ends two sets of electro-magnet windings; shifter bars guided through the ends of the housing and constituting cores for the end windings and pole pieces for one set of intermediate windings whereby each bar may occupy three positions; dogs adapted to lock the bars in their respective positions and to be released by the other set of intermediate windings, and means for selectively energizing said windings, substantially as described.

11. In speed gear changing mechanism for automobiles the combination of a plurality of magnetic windings, a set of manual switches each having two contacts, circuits for connecting a certain group of said windings through one of the contacts of each switch and in parallel with different windings at each switch, and circuits for connecting the other of said contacts to different windings at each switch, said contacts being arranged to close circuit one in advance of the other, substantially as described.

12. In speed gear changing mechanism for automobiles the combination of a plurality of magnetic windings, a set of manual switches having contacts, and circuits for connecting certain groups of said windings through the contacts of each switch in parallel with different windings at each switch, substantially as described.

13. Speed changing mechanism for automobiles comprising means for shifting gears, electrical devices for controlling said means, clutch mechanism and provisions interposed between the clutch mechanism and the electrical devices, whereby the latter are inoperative until the clutch is thrown out, substantially as described.

In testimony whereof I have hereunto signed my name.

FRANK BEEMER.

Witnesses:
  FRANK E. FRENCH,
  A. B. STOUGHTON.